US012689832B2

(12) United States Patent
Jun

(10) Patent No.: US 12,689,832 B2
(45) Date of Patent: Jul. 21, 2026

(54) DISPLAY SYSTEM FOR VEHICLE AND METHOD THEREFOR

(71) Applicants: Hyundai Motor Company, Seoul (KR); Kia Corporation, Seoul (KR)

(72) Inventor: Sung Hwan Jun, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/966,994

(22) Filed: Dec. 3, 2024

(65) Prior Publication Data

US 2025/0358520 A1    Nov. 20, 2025

(30) Foreign Application Priority Data

May 14, 2024    (KR) ........................ 10-2024-0063330

(51) Int. Cl.
| | |
|---|---|
| *H04N 23/69* | (2023.01) |
| *B60R 1/24* | (2022.01) |
| *B60R 1/26* | (2022.01) |
| *B60R 1/27* | (2022.01) |
| *G08G 1/0967* | (2006.01) |

(52) U.S. Cl.
CPC ............... *H04N 23/69* (2023.01); *B60R 1/24* (2022.01); *B60R 1/26* (2022.01); *B60R 1/27* (2022.01); *G08G 1/096766* (2013.01); *B60R 2300/602* (2013.01); *B60R 2300/607* (2013.01); *B60R 2300/8066* (2013.01); *B60R 2300/8093* (2013.01)

(58) Field of Classification Search
CPC .. H04N 23/69; B60R 1/24; B60R 1/26; B60R 1/27; B60R 2300/602; B60R 2300/607; B60R 2300/8066; B60R 2300/8093; G08G 1/096766
USPC .......................................................... 348/148
See application file for complete search history.

(56) References Cited

U.S. PATENT DOCUMENTS

| | | | | |
|---|---|---|---|---|
| 7,031,832 | B2 * | 4/2006 | Kawasaki | .......... G01C 21/3407 701/411 |
| 10,109,185 | B1 * | 10/2018 | Dubois, Jr. | .......... G08G 1/0133 |
| 2007/0189747 | A1 * | 8/2007 | Ujisato | .................. G03B 37/04 396/322 |
| 2010/0231715 | A1 * | 9/2010 | Garner | ...................... B60R 1/26 348/148 |
| 2012/0105643 | A1 * | 5/2012 | Ozaki | .................... G08G 1/168 348/148 |
| 2013/0243261 | A1 * | 9/2013 | Matsuda | ................ G08G 1/166 382/106 |
| 2014/0176767 | A1 * | 6/2014 | Hamel | ............... H04N 1/19594 348/240.2 |

(Continued)

*Primary Examiner* — Matthew David Kim

(74) *Attorney, Agent, or Firm* — Banner & Witcoff, Ltd.

(57) ABSTRACT

A display system for a vehicle includes a sensor configured to detect an approaching object at a rear of an ego vehicle, at least one camera configured to photograph the approaching object at the rear, a display configured to output an image photographed by the camera, and a controller, and the controller receives driving-related information about the approaching object at the rear from the sensor, determines whether the driving-related information satisfies a preset criterion, changes a zoom magnification of the image according to a result of the determination, and outputs the image with the changed zoom magnification on the display.

19 Claims, 8 Drawing Sheets

(56)            References Cited

U.S. PATENT DOCUMENTS

| | | | |
|---|---|---|---|
| 2014/0347485 A1* | 11/2014 | Zhang | B60R 1/28 |
| | | | 348/148 |
| 2016/0052548 A1* | 2/2016 | Singh | G06V 20/58 |
| | | | 701/41 |
| 2017/0048462 A1* | 2/2017 | Keskin | G06T 7/80 |
| 2017/0132932 A1* | 5/2017 | Yi | H04N 5/907 |
| 2017/0316695 A1* | 11/2017 | Sugimoto | G08G 1/164 |
| 2018/0301115 A1* | 10/2018 | Wang | H04N 7/18 |
| 2019/0191064 A1* | 6/2019 | Aihara | B60R 1/26 |
| 2019/0322222 A1* | 10/2019 | Kondou | G08G 1/163 |
| 2023/0027291 A1* | 1/2023 | Haran | H04W 4/46 |
| 2023/0316773 A1* | 10/2023 | Avadhanam | G06V 20/56 |
| | | | 382/104 |

* cited by examiner

DISPLAY SYSTEM FOR VEHICLE AND METHOD THEREFOR

CROSS-REFERENCE TO RELATED APPLICATIONS

The present application claims priority to Korean Patent Application No. 10-2024-0063330, filed on May 14, 2024, the entire contents of which are incorporated herein by reference for all purposes.

TECHNICAL FIELD

The present disclosure relates to a display system for a vehicle and a method therefor.

BACKGROUND

A rear-view mirror in a vehicle may be designed to secure a rear view when driving.

A conventional rear-view mirror has been made by a mirror, but a digital rear-view mirror may be used in a vehicle.

The digital rear-view mirror may be linked to a rear camera, allowing a driver to view images captured by the rear camera in real time.

Such a digital rear-view mirror may solve various problems of conventional rear-view mirrors, for example, by securing a wider rear view than the conventional rear-view mirror using a wide angle camera, and by allowing the rear view to be checked despite the block of the view due to a rear-seat passenger or luggage, or external factors such as snow or rain.

However, if the digital rear-view mirror simply transmits the rear camera image to the interior rear-view mirror, there may be a problem in that the driver cannot perceive the perspective of a rear vehicle in comparison to a general mirror.

For example, when driving or while parking, if the distance to a rear object becomes closer, a blind spot that is not displayed in the digital rear-view mirror image widens, and it makes difficult for the driver to know how close the rear object is to the vehicle.

Additionally or alternatively, if a rear vehicle approaches at high speed but is far away, the size of the rear vehicle is displayed small in the digital rear-view mirror image, making it difficult to recognize the dangerous situation and respond to the situation.

The matters described in this Background section are only for the enhancement of understanding of the background of the disclosure, and should not be taken as acknowledgment that they correspond to prior art already known to those skilled in the art.

SUMMARY

Various aspects of the present disclosure are directed to provide a display system for a vehicle, which secures an appropriate perspective of a rear view that is output on a display, and allows a driver to intuitively recognize the distance to a counterpart vehicle, and a method therefor.

Additionally or alternatively, various aspects of the present disclosure are directed to provide a display system for a vehicle, which can expand the range of customer choices by allowing the customer to select whether to activate the function to be provided by the present disclosure and the activation conditions, and a method therefor.

The technical objects that are to be achieved through the present disclosure are not limited to the technical objects mentioned above, and other technical objects not mentioned can be clearly understood by those skilled in the art from the description below.

A display system for a vehicle may comprise: a sensor configured to detect an approaching object at a rear side of the vehicle; at least one camera configured to obtain an image of the approaching object; a display device configured to output the image obtained by the camera; and a controller configured to: receive driving-related information related to the approaching object from the sensor, determine whether the driving-related information satisfies a preset criterion, change, based on the driving-related information satisfying the preset criterion, a zoom magnification of the image, and output the image with the changed zoom magnification on the display device.

The controller may be configured to determine whether the driving-related information satisfies the preset criterion by determining whether a distance between the vehicle and the approaching object is within a first set value, and change, based on the distance being within the first set value, the zoom magnification to a magnification lower than a current zoom magnification.

The magnification may be a magnification that allows an entire shape of the approaching object be displayed on a screen of the display device.

The controller may be configured to receive an input of the first set value via a user interface.

The controller may be configured to determine whether the driving-related information satisfies the preset criterion by determining whether a distance between the vehicle and the approaching object is within a first set value. Based on the distance not being within the first set value, the controller may be configured to determine whether a relative speed of the approaching object relative to a speed of the vehicle is greater than or equal to a second set value, and change, based on the relative speed being greater than or equal to the second set value, the zoom magnification to a magnification greater than a current zoom magnification.

The magnification may be a magnification within a range where an entire shape of the approaching object is displayed on a screen of the display device.

Based on the relative speed being greater than or equal to the second set value, the controller may be configured to: extract a license plate area of the approaching object and store the extract license plate area as an image; or output a warning message regarding the approaching object on a screen of the display device.

The controller may be configured to receive an input of the second set value via a user interface.

The controller may be configured to receive, via a user interface, an input indicating whether to activate a function of changing the zoom magnification.

The controller may be configured to receive an input to allow the function of changing the zoom magnification to be activated based on a preset state of traffic congestion being satisfied.

In response to receiving the input to allow the function of changing the zoom magnification to be activated based on the preset state of traffic congestion being satisfied, the controller may be configured to receive navigation information related to the traffic congestion, and activate, based on the navigation information related to the traffic congestion, a function of outputting a front image or surround view monitor (SVM) top view image.

The display system may comprise a camera configured to obtain a front image or a surround view monitor (SVM) top view image. The controller may be configured to determine whether a speed of the vehicle is lower than or equal to a third set value, and based on the speed of the vehicle being lower than or equal to the third set value, output the front image or the SVM top view image on a screen of the display device.

The controller may be configured to allow the front image or the SVM top view image to be output separately from the image output with the changed zoom magnification.

The controller may be configured to receive, via a user interface, an input indicating whether to activate the third set value or an input indicating whether to activate a function of outputting the front image or the SVM top view image.

The controller may be configured to receive an input to allow the function of outputting the front image or the SVM top view image to be activated based on a preset state of traffic congestion being satisfied.

In response to receiving the input to allow the function of outputting the front image or the SVM top view image to be activated based on the preset state of the traffic congestion being satisfied, the controller may be configured to receive navigation information related to the traffic congestion, and activate, based on the navigation information related to the traffic congestion, a function of outputting the front image or the SVM top view image.

The controller may be configured to determine, based on a turn signal of the vehicle being off, an approaching object directly behind the vehicle as the approaching object, or determine, based on a turn signal of the vehicle being on, an approaching object laterally behind the vehicle as the approaching object.

For detection of an approaching object directly behind the vehicle, the controller may be configured to limit a detection range of the sensor to a width of a driving lane of the vehicle.

For detection of an approaching object laterally behind the vehicle, the controller may be configured to limit a detection range of the sensor to a width of a driving lane of the approaching object laterally behind the vehicle.

A method performed by an apparatus of a vehicle may comprise: detecting, via a sensor of the vehicle, an approaching object at a rear side of the vehicle; receiving, from the sensor, driving-related information related to the approaching object; determining, by a controller of the vehicle, at least one of whether a distance between the approaching object and the vehicle is smaller than or equal to a first set value or whether a relative speed of the approaching object relative to a speed of the vehicle is greater than or equal to a second set value; changing, based on at least one of the distance being smaller than or equal to the first set value or the relative speed being greater than or equal to the second set value, a zoom magnification of an image of the approaching object; and outputting the image with the changed zoom magnification on a screen of a display device of the vehicle.

The apparatus of the vehicle may further perform one or more operations and/or implement one or more features recited herein.

According to a display system for a vehicle and a method thereof related to at least one example of the present disclosure configured as described above, it is possible to secure an appropriate sense of perspective in the rear view by changing the zoom magnification of an image captured by a rear camera according to driving information of a rear object approaching an ego vehicle.

Additionally or alternatively, it is possible to cope with the threatening driving of the rear vehicle by capturing and saving the license plate area of the threatening driving vehicle at the rear or displaying a warning message about the threatening driving together with a change in the zoom magnification.

Additionally or alternatively, according to the present disclosure, it is possible to provide more information in situations such as start-up and parking and traffic congestion by additionally providing front images and Surround view monitor (SVM) top view images under low speed conditions equal to or less than a certain vehicle speed, and it is possible to diversify options for the customer by allowing the customer to select whether to activate the zoom magnification change and/or front image output condition and zoom magnification change and front image or SVM top view image output functions.

The effects that can be obtained from the present disclosure are not limited to the effects mentioned above, and other effects not mentioned can be clearly understood by those skilled in the art from the description below.

DETAILED DESCRIPTION

Figure 1:
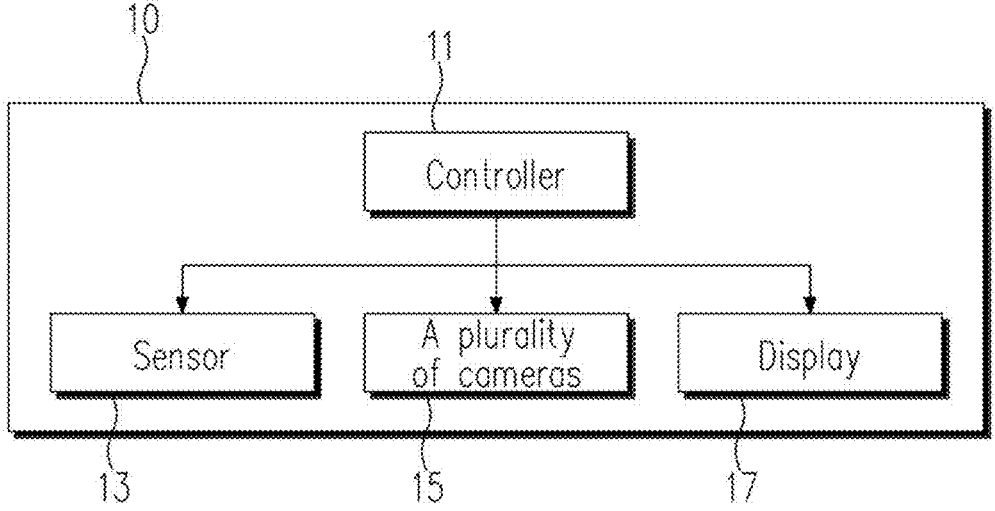
FIG. 1 shows an example block diagram showing a display system of a vehicle according to an example of the present disclosure.

Hereinafter, some examples of the present disclosure are described in detail with reference to the attached drawings so that a person having ordinary skill in the art to which the present disclosure pertains can easily practice the present disclosure. However, the present disclosure may be implemented in various different forms and is not limited to the examples described herein. And in order to clearly explain the present disclosure in the drawings, parts that are not related to the explanation are omitted, and similar parts are given similar drawing reference numerals throughout the specification.

For purposes of this application and the claims, using the exemplary phrase "at least one of: A; B; or C" or "at least one of A, B, or C," the phrase means "at least one A, or at least one B, or at least one C, or any combination of at least one A, at least one B, and at least one C. Further, exemplary phrases, such as "A, B, and C", "A, B, or C", "at least one of A, B, and C", "at least one of A, B, or C", etc. as used herein may mean each listed item or all possible combinations of the listed items. For example, "at least one of A or B" may refer to (1) at least one A; (2) at least one B; or (3) at least one A and at least one B.

The terms used in the present disclosure are used to explain a particular example, and are not intended to limit the present disclosure. A singular term in the present disclosure includes a plural term unless it is contextually, clearly means a singular form. In the present disclosure, the terms such as "include" or "have" are to specify that there are features, numbers, steps, operations, components or parts described in the present disclosure, or combinations thereof, and It should be understood that the presence or the possibility of addition of numbers, steps, operations, components, part, or combinations thereof are not excluded in advance.

The terms "part," "unit," "module," etc., used in the present disclosure mean a unit that processes at least one function or operation, which may be implemented by hardware, software, or a combination of hardware and software.

Terms including ordinal numbers such as "first" and "second" may be used to explain various components, but the components are not limited by the terms. The terms may be used only in a name for distinguishing one component from another component, and the sequence between them is recognized by the context of the description, not by the names.

The term "and/or" is used to include all the cases of any combination of the plural items that are subject to the target. For example, "A and/or B" means all three cases of "A", "B", "A and B".

When a component is referred to as "connected" or "linked" to another component, it may be directly connected to or linked to that another component, but it should also be understood that there may be further another component therebetween.

Unless defined differently, all the terms used here, including technical or scientific terms, have the same meaning as commonly understood by those who have normal knowledge in the technical field to which the present disclosure belongs. Terms such as what are commonly used in the dictionary should be interpreted as having the meaning of the context of the relevant technology, and are not interpreted as an ideal or excessively formal meaning unless defined clearly in the present disclosure.

Hereinafter, examples of the present disclosure will be described in detail with reference to the accompanying drawings.

FIG. 1 shows an example block diagram showing a display system of a vehicle according to an example of the present disclosure.

As shown in FIG. 1, a vehicle display system 10 according to the present disclosure may include a sensor 13 for detecting an approaching object at the rear of a vehicle, at least one camera 15 for photographing the approaching object at the rear, a display 17 for outputting an image photographed by the at least one camera, and a controller 11.

In the present disclosure, the rear may include both the immediate rear and the rear-lateral. The approaching object from the rear may include an approaching object at the immediate rear and the rear-lateral.

The sensor 13 may comprise a camera, a lidar, a radar, an ultrasonic sensor, an infrared sensor, an infrared camera, a thermal imaging camera, a blind spot monitoring sensor, a line departure warning sensor, a parking sensor, a light sensor, a rain sensor, a traction control sensor, an anti-lock braking system sensor, a tire pressure monitoring sensor, a seatbelt sensor, an airbag sensor, a fuel sensor, an emission sensor, a throttle position sensor, a gyroscope, a speedometer, a magnetometer, etc., and there is no limitation on the type as long as it can detect targets in the surroundings. The sensor may be used, for example, for monitoring surrounding environments and/or autonomous driving control.

Additionally or alternatively, detection of an approaching object from the rear may be achieved not only by using the above sensor, but also by receiving GPS information through V2V communication or Advanced Driver Assistance Systems (e.g., ADAS_PARK). The above scheme is only an example, and other detection schemes may also be used.

At least one camera 15 for capturing an approaching object from the rear may be located, for example, on the trunk or bumper of the vehicle, or inside the rear window, but the example is not limited to these examples.

Additionally or alternatively, at least one camera 15 for photographing an approaching object from the rear may be an immediate rear camera, a rear-lateral camera, or a rear wide camera, and hereinafter, these cameras are collectively referred to as rear cameras.

The display 17 may be a digital rear-view mirror, but the example is not necessarily limited to this example and may include other displays. For the convenience of explanation, the following description may be given using the digital rear-view mirror as an example.

The controller controls the overall operation related to the display of the vehicle, and the specific operation thereof is described below with reference to FIG. 2A and FIG. 2B.

Figure 2A:
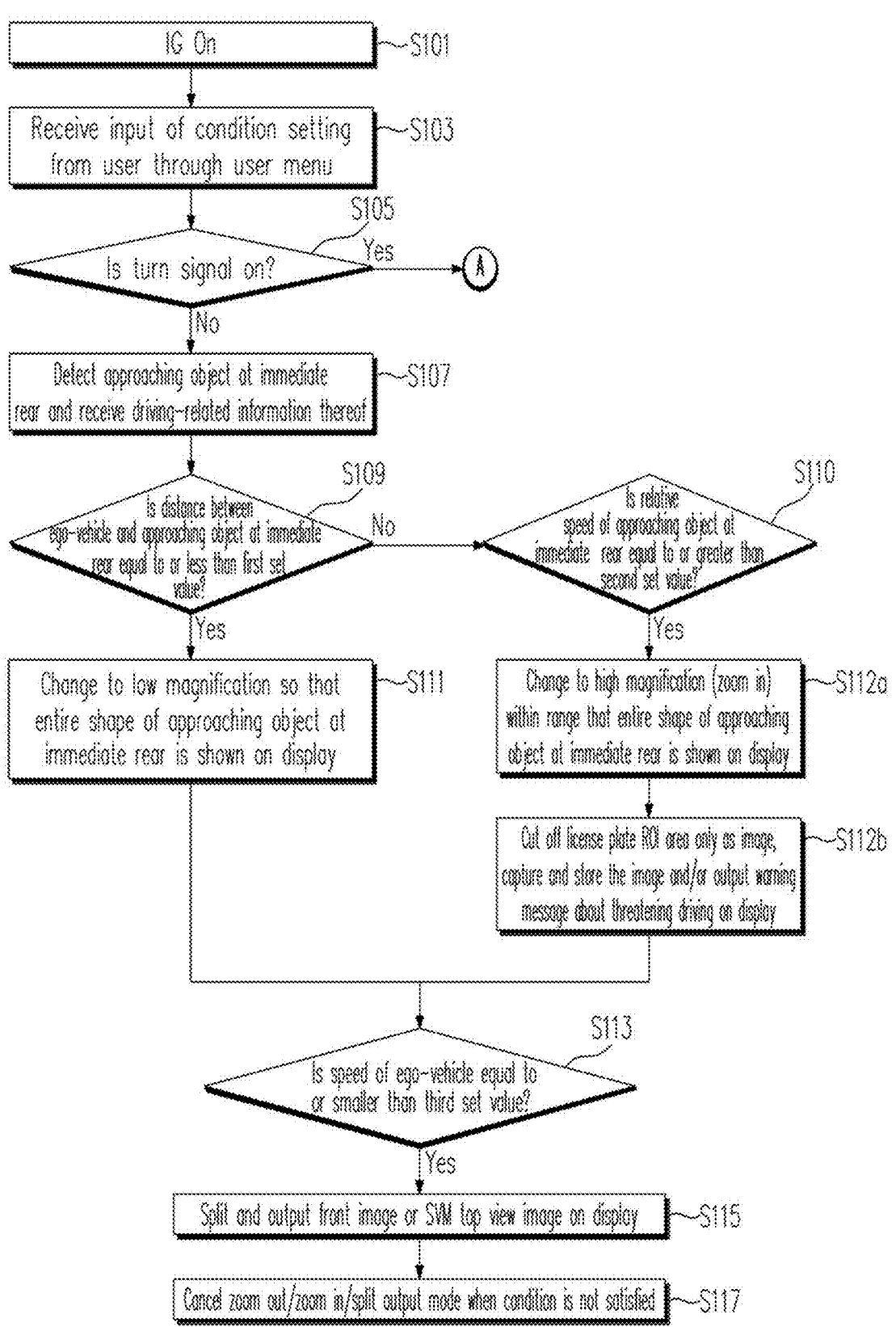
FIG. 2A shows an example flowchart showing the operation of a display system of a vehicle according to an example of the present disclosure.

FIG. 2A shows an example flowchart showing the operation of a display system of a vehicle according to an example of the present disclosure.

Figure 2B:
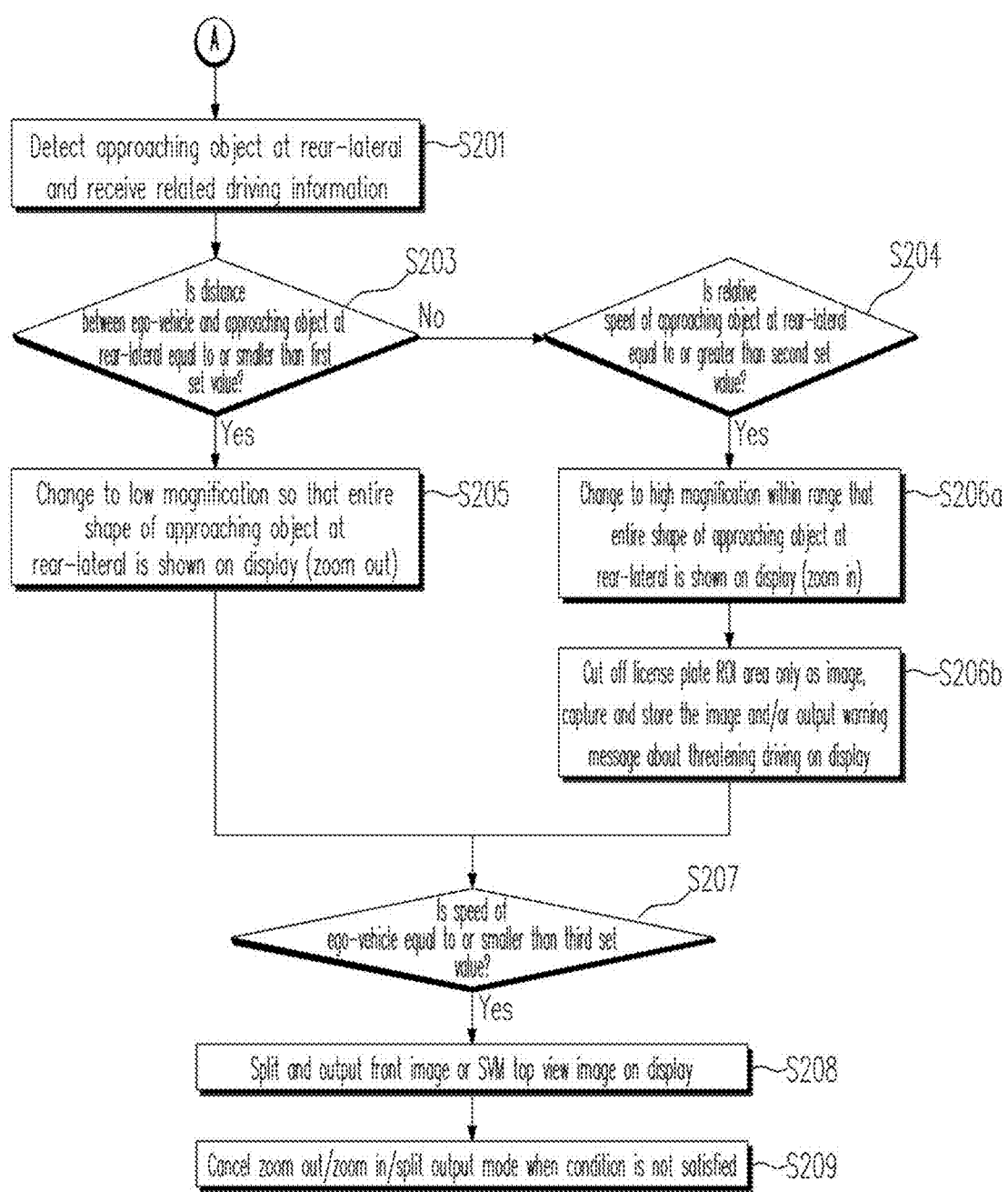
FIG. 2B shows an example flowchart showing the operation of a display system of a vehicle according to an example of the present disclosure.

FIG. 2B shows an example flowchart showing the operation of a display system of a vehicle according to an example of the present disclosure.

As shown in FIG. 2A, the display system of the vehicle first may determine whether the vehicle's ignition is turned on (S101).

The controller may receive input regarding condition settings from the user through a user menu (S103). The content related thereto will be explained with reference to FIG. 7 after completing the explanation about FIG. 2A and FIG. 2B.

Even if conditions are not entered by the user through the process S103, subsequent processes may be performed based on previously entered conditions or default settings.

The controller may determine the state of the turn signal in process S105. At this time, if the turn signal is at the off state (N of S105), the sensor may detect an approaching object at the immediate rear in real time (S107).

If the turn signal is off, the vehicle may be driving without changing lanes, so an approaching object at the immediate rear needs be detected. The controller may limit the detection range of the sensor to the width of the vehicle's driving lane to prevent false detection.

Figure 3:
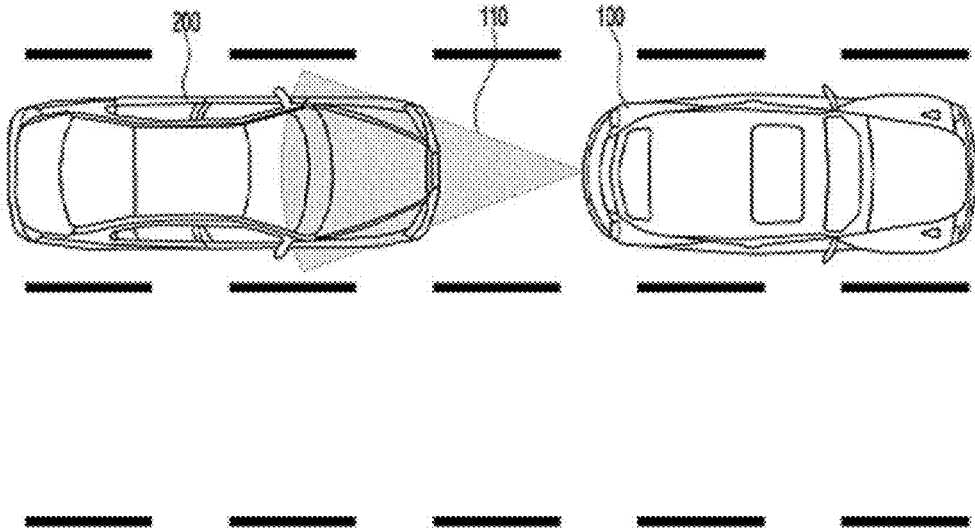
FIG. 3 shows an example diagram showing the detection range of a sensor when a turn signal is turned off according to one example of the present disclosure.

As shown in FIG. 3, the detection area 110 of the sensor of an ego vehicle 100 may be limited to the width of the driving lane of the ego vehicle, and in this case, only the vehicles 200 at the immediate rear become the detection target.

The controller may receive driving-related information of the detected approaching object at the immediate rear (S107).

Driving-related information of the approaching object may be information acquired by a sensor that detects an approaching object from the rear, and may include the speed of the approaching object at the immediate rear, and the distance between the vehicle and the approaching object at the immediate rear.

The controller may calculate the relative speed of the approaching object at the immediate rear by using the speed information of the ego vehicle and the speed information of the approaching object at the immediate rear.

The controller may determine whether the distance between the ego vehicle and the approaching object at the immediate rear is less than or equal to a first set value (S109).

Based on the result of the determination, if the distance between the ego vehicle and the approaching object at the immediate rear is within the first set value, the current zoom magnification may be changed to a lower magnification. In this case, the magnification value may be changed so that the entire shape of the approaching object at the immediate rear is expressed within the digital rear-view mirror image (S111).

In order to ensure that the entire shape of the approaching object at the immediate rear may be fully expressed within the digital rear-view mirror image, the controller may identify the entire shape or size of the approaching object at the immediate rear through a sensor. This may also apply to the approaching object at the rear-lateral.

Figure 4:
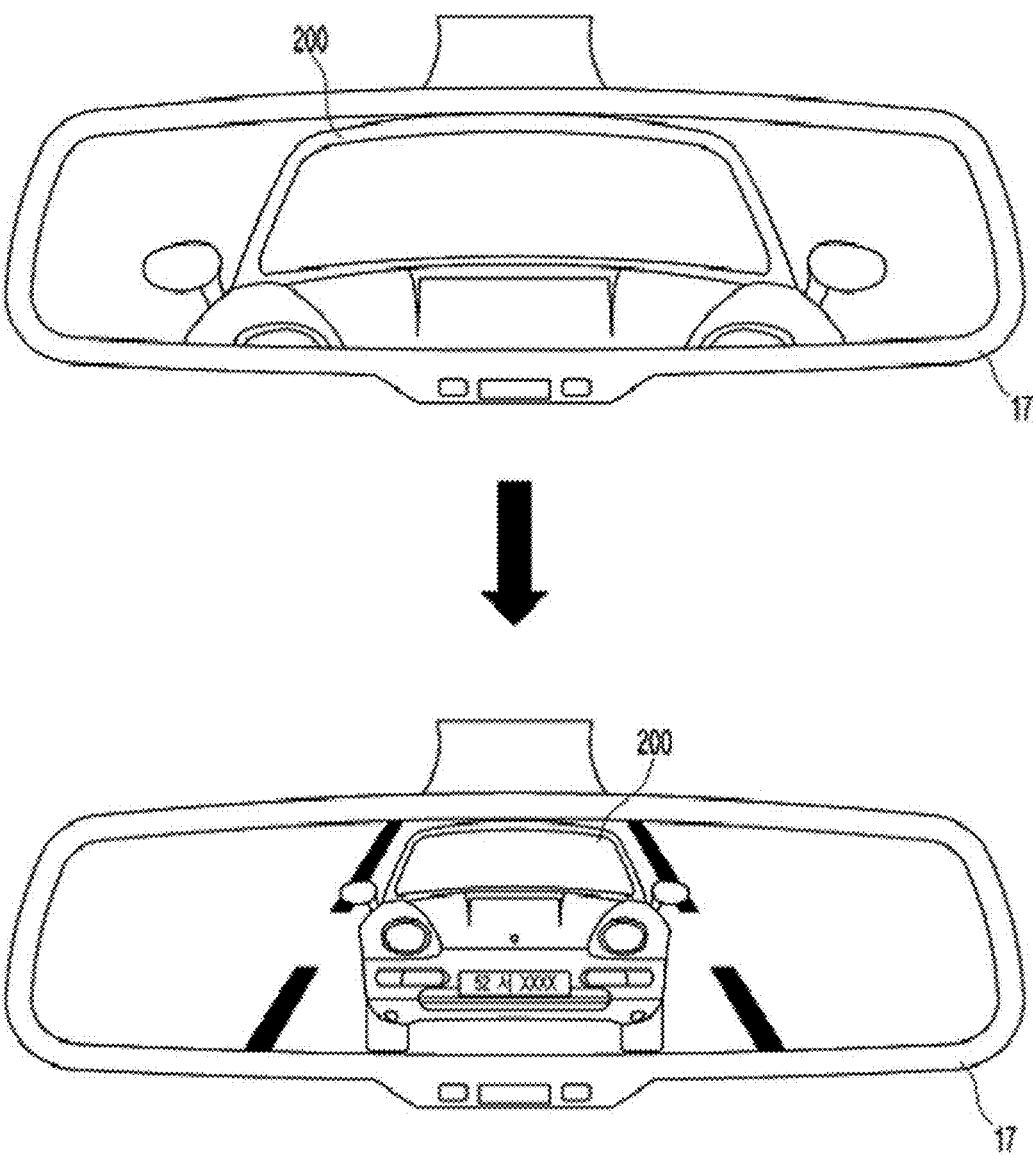
FIG. 4 shows an example diagram showing an operation of changing to a low magnification and a display output image according to the operation, according to one example of the present disclosure.

For example, as shown in FIG. 4, if the distance between the ego vehicle and the approaching object 200 at the immediate rear becomes smaller than the reference value, and the entire shape of the approaching object at the immediate rear is not visible on the digital rear-view mirror 17, the controller may change the magnification of the rear camera or the image captured by the rear camera to a magnification lower than the current magnification (zooms out) so that the entire shape of the approaching object 200 at the immediate rear is displayed on the digital rear-view mirror 17.

For example, if the distance between the ego vehicle and the approaching object at the immediate rear is not within the first set value, the controller may determine whether the relative speed of the approaching object at the immediate rear is greater than or equal to the second set value (S110).

As a result of the determination, if the relative speed of the approaching object at the immediate rear is equal to or greater than the second set value, the current zoom magnification may be changed to a higher magnification. In this case, the magnification value may be determined within a range where the entire shape of the approaching object at the immediate rear is expressed within the digital rear-view mirror image (S112a).

Additionally or alternatively, if the relative speed of an approaching object at the immediate rear is greater than the second set value, the controller may determine that it is a threatening driving and may zoom in on the image at the immediate rear at a high magnification, extract the license plate area of the approaching object at the immediate rear, capture and save the image, or output a warning message regarding the threatening driving of the approaching object at the immediate rear on the digital rear-view mirror (S112b).

Figure 5:
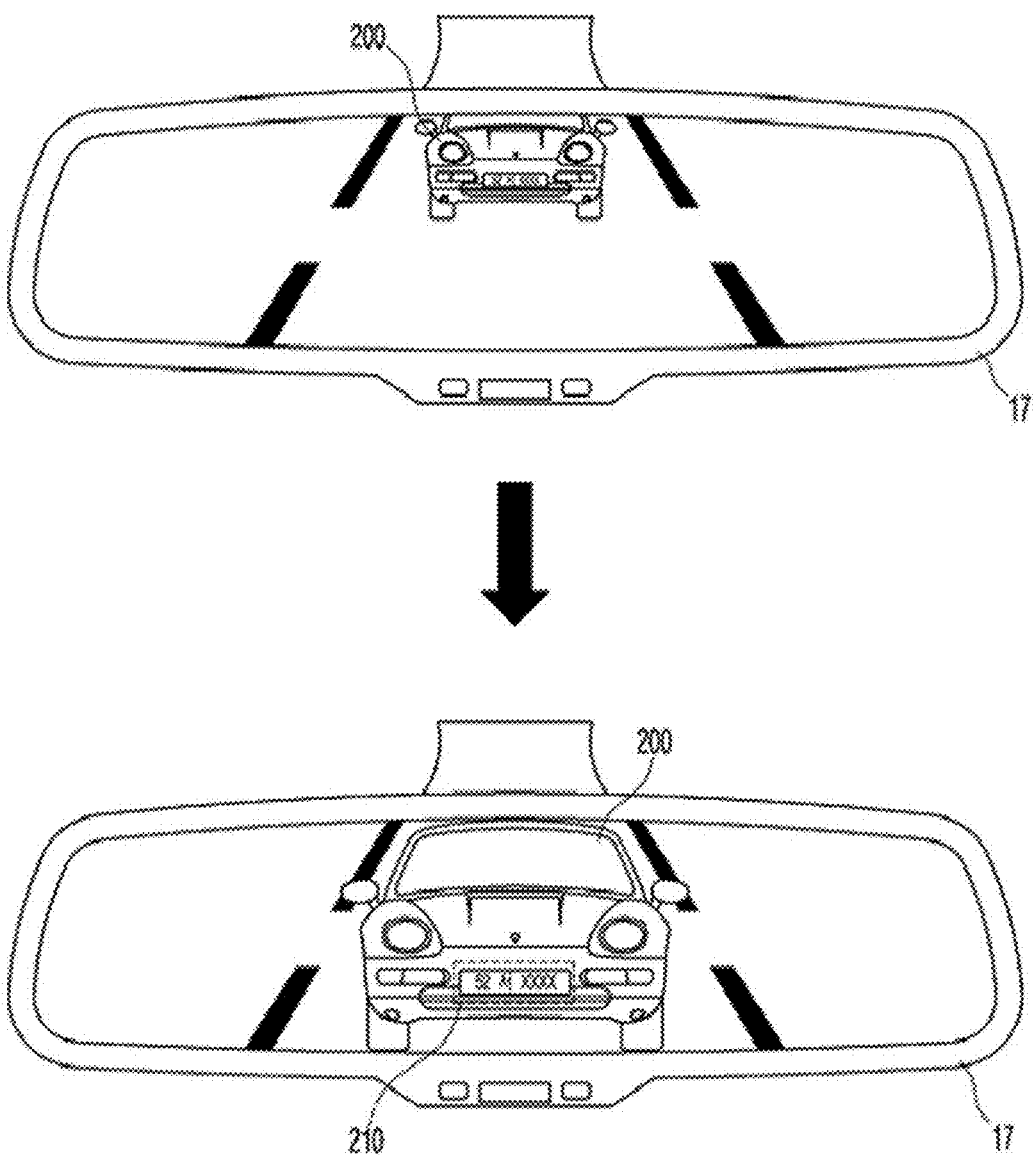
FIG. 5 shows an example diagram showing an operation of changing to a high magnification and a display output image according to the operation, according to one example of the present disclosure.

For example, as shown in FIG. 5, even though the distance to the approaching object at the immediate rear 200 is greater than a reference value, if the relative speed of the approaching object at the immediate rear 200 is greater than a reference value, the controller may change the rear camera or the image captured by the rear camera to a high magnification (zoom in) within a range where the entire shape approaching object at the immediate rear is visible in order to display the enlarged shape of the approaching object at the immediate rear on the digital rear-view mirror 17, and may separately cut out, capture, and store the license plate area 210.

The warning message may be displayed in a manner that the driver can recognize the threatening driving of a vehicle at the immediate rear, by turning on a red light or generating a warning sound, etc. The above scheme is only an example, and the example is not limited to this example.

The controller may additionally or alternatively determine whether the speed of the ego vehicle is lower than or equal to a third set value (S113), and if the speed is lower than or equal to the third set value, the front image or the surround view monitor (SVM) top view image is also output to the digital rear-view mirror.

The SVM top view image may be an image that is seen when observing the image, which is obtained by capturing the scenes around the vehicle by a plurality of cameras, from the above, that is, a top view image.

The front image or SVM top view image may be split and output together with the immediate rear image to the digital rear-view mirror (S115).

If conditions S109, S110, and S113 are not satisfied, the high or low magnification output mode, or the split output mode of the front image or SVM top view image may be disabled (S117).

Hereinafter, the operation of the vehicle's display system if the turn signal is turned on (Y of S105) in FIG. 2A will be explained with reference to FIG. 2B.

As shown in FIG. 2B, the operation of the vehicle's display system if the turn signal is on flows in the same manner as if the turn signal is off. Since this is a situation where the driving lane is to be changed, the object that serves as the criterion for determining the detection and zoom magnification conditions is the approaching object at the rear-lateral, not the approaching object at the immediate rear, and the image obtained by capturing the approaching object at the rear-lateral is output on the digital rear-view mirror.

If the turn signal is on (A), the sensor may detect an approaching object approaching object at the rear-lateral (S201).

In this case, the controller may limit the detection range of the sensor to the width of the driving lane of the approaching object at the rear-lateral to prevent false detection.

Figure 6:
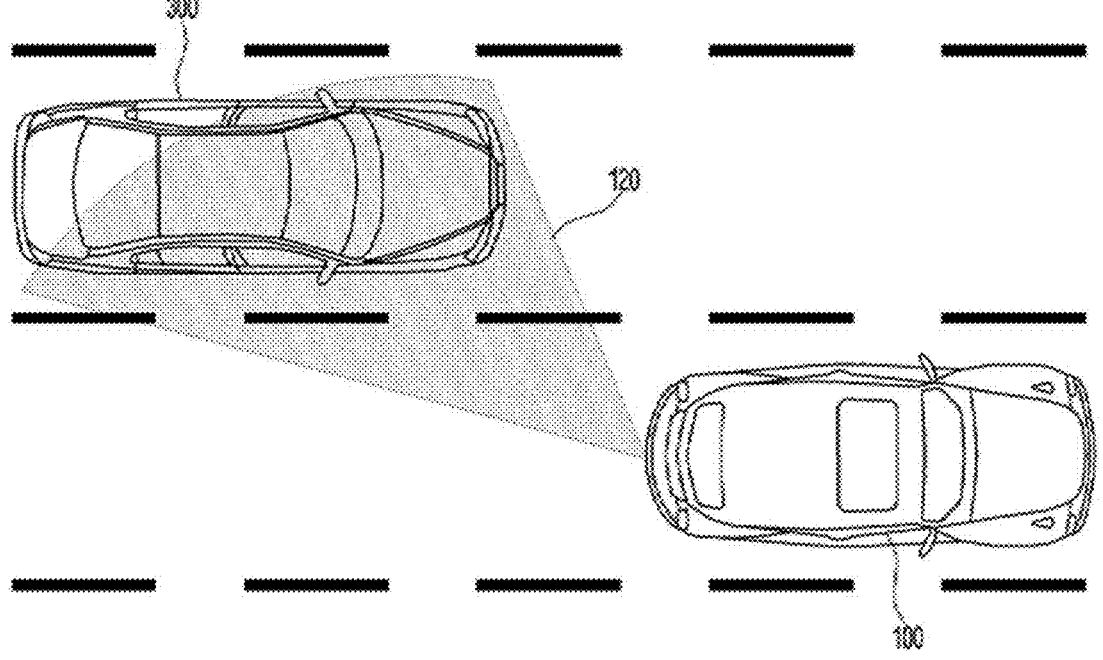
FIG. 6 shows an example diagram showing the detection range of a sensor when a turn signal is turned on according to one example of the present disclosure.

As shown in FIG. 6, the detection area 120 of the sensor of an ego vehicle 100 may be limited to the width of the driving lane of the approaching object at the rear-lateral 300, and in this case, only the vehicle 300 at the rear-lateral becomes the detection target.

The controller may receive driving-related information of the detected approaching object at the rear-lateral (S201).

Driving-related information of the approaching object may be information acquired by a sensor that detects an approaching object from the rear, and may include the speed of the approaching object at the rear-lateral, and the distance between the ego vehicle and the approaching object at the rear-lateral.

The controller may calculate the relative speed of the approaching object at the rear-lateral by using the speed information of the ego vehicle and the speed information of the approaching object at the rear-lateral.

The controller determines whether the distance between the ego vehicle and the approaching object at the rear-lateral is less than or equal to a first set value (S203).

Based on the result of the determination, if the distance between the ego vehicle and the approaching object at the rear-lateral is within the first set value, the current zoom magnification may be changed to a lower magnification. In this case, the magnification value may be changed so that the entire shape of the approaching object at the rear-lateral is expressed within the digital rear-view mirror image (S205).

In this case, the overall shape or size of the approaching object at the rear-lateral may be identified through the sensor.

If the distance between the ego vehicle and the approaching object at the rear-lateral becomes smaller than the reference value, and accordingly the entire shape of the approaching object at the rear-lateral is not seen, the magnification of the rear camera or the image captured by the rear camera may be changed to a low magnification (zoom out) so that the entire shape of the approaching object at the rear-lateral may be displayed on the digital rear-view mirror.

If the distance between the ego vehicle and the approaching object at the rear-lateral is not within the first set value, the controller may determine whether the relative speed of the approaching object at the rear-lateral is greater than or equal to the second set value (S204).

As a result of the determination, if the relative speed of the approaching object at the rear-lateral is equal to or greater than the second set value, the current zoom magnification is changed to a higher magnification. In this case, the zoom magnification value may be determined within a range where the entire shape of the approaching object at the rear-lateral is expressed within the digital rear-view mirror image (S206a).

Additionally or alternatively, if the relative speed of an approaching object at the rear-lateral is greater than the second set value, the controller may determine that it is a threatening driving and may zoom in on the image at the rear-lateral at a high magnification, then extract the license plate area of the approaching object at the rear-lateral, capture and save the image, or output a warning message regarding the threatening driving of the approaching object at the rear-lateral on the digital rear-view mirror (S206b).

Even though the distance to the approaching object at the rear-lateral is large, if the relative speed of the approaching object at the rear-lateral is faster than a reference value, the controller may change the magnification of the rear camera or the image captured by the rear camera to a high magnification (zoom in) within the range where the entire shape of the approaching object at the rear-lateral is visible, and accordingly display the enlarged shape of the approaching object at the rear-lateral on the digital room mirror, and may separately cut out, capture and save the license plate area.

The warning message may be displayed in a manner that the driver can recognize the threatening driving of a vehicle at the rear-lateral, by turning on a red light or generating a warning sound, etc. The above scheme is only an example, and the example is not limited to this example.

The controller additionally determines whether the speed of the ego vehicle is lower than or equal to a third set value (S207), and if the speed is lower than or equal to the third set value, the front image or the surround view monitor (SVM) top view image is also output to the digital rear-view mirror.

The front image or SVM top view image may be split and output together with the rear-lateral image to the digital rear-view mirror (S208).

If conditions S109, S110, and S113 are not satisfied, the high or low magnification output mode, or the split output mode of the front image is disabled (S209).

In this way, according to the present disclosure, it is possible to secure an appropriate sense of perspective in the rear view by changing the zoom magnification of the image captured by the rear camera according to the driving information of a rear object approaching the ego vehicle.

Additionally or alternatively, it is possible to cope with the threatening driving of the rear vehicle by capturing and saving the license plate area of the threatening driving vehicle at the rear or displaying a warning message about the threatening driving together with a change in the zoom magnification.

Additionally or alternatively, according to the present disclosure, it is possible to provide more information in situations such as start-up and parking and traffic congestion by additionally providing front images and Surround view monitor (SVM) top view images under low speed conditions equal to or less than a certain vehicle speed, and it is possible to diversify options for the customer by allowing the customer to select whether to activate the zoom magnification change and/or front image output condition and zoom magnification change and front image or SVM top view image output functions.

Figure 7:
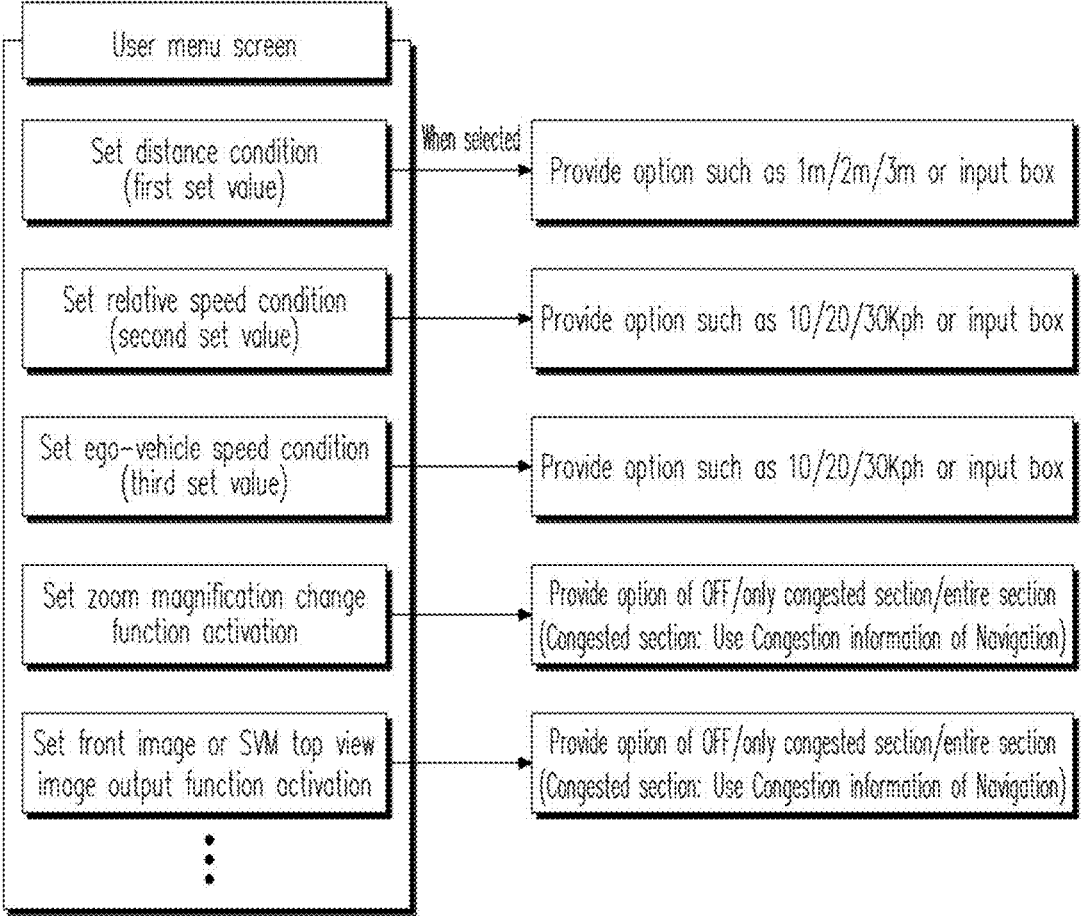
FIG. 7 shows an example drawing showing a user menu according to one example of the present disclosure.

FIG. 7 shows an example drawing showing a user menu according to one example of the present disclosure. This may correspond to S103 in FIG. 2A and FIG. 2B.

As shown in FIG. 7, the user menu may allow the customer to select or input a first set value as a reference value for the distance between the ego vehicle and a rear approaching object, a second set value as a reference value for the relative speed of the rear approaching object, and a third set value as a reference value for the speed of the ego vehicle, and provides selection options to allow the customer to select whether to activate the zoom magnification change function and/or whether to activate the front image or SVM top view image output function.

For example, the user menu may be provided through an in-vehicle audio video navigation (AVN) screen.

The first setting value may be provided as an optional choice such as 1 m, 2 m, 3 m, etc., but this is only an example, and the customer may input any value.

The second set value may be provided as an optional choice such as 10 Kph, 20 Kph, 30 Kph, etc., but this is only an example, and the customer may input any value.

The third set value may be provided as an optional choice such as 10 Kph, 20 Kph, 30 Kph, etc., but this is only an example, and the customer may input any value.

According to an example of the present disclosure, there is provided a display system for a vehicle, comprising a sensor configured to detect an approaching object at a rear of the vehicle, at least one camera configured to obtain an image of the approaching object at the rear, a display device configured to output the image obtained by the camera, and a controller, wherein the controller is configured to receive driving-related information related to the approaching object from the sensor, determine whether the driving-related information satisfies a preset criterion, change a zoom magnification of the image according to a result of the determination, and output the image with the changed zoom magnification on the display device.

Here, the controller may be further configured to determine whether a distance between the vehicle and the approaching object is within a first set value when determining whether the driving-related information satisfies the preset criterion, and change the zoom magnification to a magnification lower than a current zoom magnification if the distance is within the first set value.

Here, the magnification may be a magnification that allows an entire shape of the approaching object be displayed on a screen of the display device.

Here, the controller may receive an input of the first set value through a user menu.

Here, if the distance is not within the first set value as a result of the determination, the controller may determine whether a relative speed of the approaching object is equal to or greater than a second set value, and change the zoom magnification to a magnification greater than a current zoom magnification if the relative speed is equal to or greater than the second set value when changing the zoom magnification.

Here, the magnification may be a magnification within a range where an entire shape of the approaching object is displayed on a screen of the display device.

Here, if it is determined that the distance is equal to or greater than the second set value, the controller may extract a license plate area of the approaching object as an image and capture and store the image or output a warning message regarding the rear approaching object, on a screen of the display device.

Here, the controller may receive an input of the second set value through a user menu.

Here, the controller may receive an input regarding whether to activate a function of changing the zoom magnification through a user menu.

Here, the controller may receive an input to allow the function of changing the zoom magnification to be activated only in a preset state of traffic congestion when receiving the input regarding whether to activate the function of changing the zoom magnification.

Here, if the controller receives the input to allow the function of changing the zoom magnification to be activated only in the preset state of traffic congestion, the controller may receive navigation information related to the traffic congestion, and activate a function of outputting a front image or SVM top view image based on the navigation information of the traffic congestion.

Here, the display system may further include a camera configured to obtain a front image or a surround view monitor (SVM) top view image. Here, the controller may determine whether the speed of the ego vehicle is lower than or equal to a third set value, and if the speed is lower than or equal to the third set value, the controller may output the front image or SVM top view image on a screen of the display device.

Here, when outputting the front image or SVM top view image to the display, the controller may allow the front image or SVM top view image to be output separately from the image output with the changed zoom magnification.

Here, the controller may receive an input regarding whether to activate the third set value and/or the function of outputting the front image or SVM top view image through a user menu.

Here, the controller may receive an input to allow the function of outputting the front image or SVM top view image to be activated only in a preset state of traffic congestion when receiving the input regarding whether to activate the function of outputting the front image or SVM top view image.

Here, if the controller receives the input to allow the function of changing the zoom magnification to be activated only in the preset state of the traffic congestion, the controller may receive navigation information related to the traffic congestion, and activate a function of outputting the front image or SVM top view image based on the navigation information related to the traffic congestion.

Here, the approaching object at the rear may comprise an approaching object directly behind the vehicle if a turn signal of the vehicle is off, and the approaching object may comprise an approaching object laterally behind the vehicle if the turn signal is on.

Here, the sensor may detect the approaching object directly behind the vehicle, the controller may limit a detection range of the sensor to a width of a driving lane of the ego vehicle.

Here, when the sensor detects the approaching object laterally behind the vehicle, the controller may limit a detection range of the sensor to a width of a driving lane of the approaching laterally behind the vehicle.

According to an example of the present disclosure, there is provided a display method of a vehicle, including detecting an approaching object at a rear of the vehicle, receiving driving-related information about the approaching object, determining whether a distance between the approaching object and the vehicle is equal to or smaller than a first set value or determining whether a relative speed of the approaching object is equal to or greater than a second set value, changing a zoom magnification of an image of the approaching object according to a result of the determination, and outputting the image with the changed zoom magnification on a screen of a display device.

If setting whether to activate the function to change the zoom magnification and whether to activate the function to output the front image or SVM top view image, an option may be provided to enable or disable the function for the entire driving section, or to activate the function only when the navigation traffic congestion section information is received and the section is determined to be a traffic congestion section. This is because a situation that vehicles are very close to each other frequently occurs in the traffic congestion section.

According to the present disclosure, it is possible to improve the customer selection option rate by allowing the customer to select conditions for changing the zoom magnification and/or outputting a front image or SVM top view image and whether to activate the function of changing the zoom magnification and outputting the front image or SVM top view image.

Additionally or alternatively, "unit", "control unit", "control device" or "controller" is a term widely used as a name of a device that controls its function, and does not mean a general function unit. For example, a device, which uses one of the above names, may include a communication device which communicates with another controller or sensor for control of the function, a recording medium which may be read by a computer that stores an operating system, a logic command, and input and output information, etc., and one or more processors which perform judgment, operations, and decisions required for the function control.

Further, a processor may include a semiconductor integrated circuit and/or electronic devices that perform at least one or more of comparison, judgment, operation, and decision to achieve a programmed function. For example, the processor may be any one or a combination of a computer, a microprocessor, CPU, ASIC, and an electronic circuits (circuitry, logic circuits).

The above-described display method of the vehicle may be implemented as a computer-readable code on a medium having a program recorded thereon. Computer-readable media include any type of recording device that stores data readable by a computer system. For example, the storage medium may include at least one of a flash memory, a hard disk type memory, a micro type memory, a card type memory, a secure digital (SD) card, an extreme digital (XD) card, a random access memory (RAM), a static RAM, a read-only memory (ROM), a programmable ROM (PROM), an electrically erasable PROM (EEPROM), a magnetic RAM (MRAM), a magnetic disk type memory, and an optical disk type memory.

Such a recording medium may be electrically connected to a processor, and the processor may load and record data from the recording medium. A recording medium and a processor may be integrated or physically separated.

The above detailed description should not be construed as restrictive in any respect and should be considered illustrative. The scope of the present disclosure should be determined by reasonable interpretation of the appended claims, and all changes within the equivalent scope of the present disclosure are included in the scope of the present disclosure.

What is claimed is:

1. A display system for a vehicle, the display system comprising:
    a sensor configured to detect an approaching object at a rear side of the vehicle;
    at least one camera configured to obtain an image of the approaching object;
    a display device configured to output the image obtained by the camera; and
    a controller configured to:
        receive driving-related information related to the approaching object from the sensor,
        determine whether the driving-related information satisfies a preset criterion,
        change, based on the driving-related information satisfying the preset criterion, a zoom magnification of the image, and
        output the image with the changed zoom magnification on the display device,
        wherein the controller is configured to determine whether the driving-related information satisfies the preset criterion by determining whether a distance between the vehicle and the approaching object is within a first set value, and
        wherein based on the distance not being within the first set value, the controller is further configured to determine whether a relative speed of the approaching object relative to a speed of the vehicle is greater than or equal to a second set value, and change, based on the relative speed being greater than or equal to the second set value, the zoom magnification to a magnification greater than a current zoom magnification.

2. The display system of claim 1, wherein the controller is configured to:
    change, based on the distance being within the first set value, the zoom magnification to a second magnification lower than the current zoom magnification.

3. The display system of claim 2, wherein the second magnification is a magnification that allows an entire shape of the approaching object be displayed on a screen of the display device such that a size of the displayed image of the approaching object is smaller than a size of a real-time image of the approaching object when the approaching object is in a blind spot of the vehicle.

4. The display system of claim 2, wherein the controller is further configured to receive an input of the first set value via a user interface.

5. The display system of claim 1, wherein the magnification is a magnification within a range where an entire shape of the approaching object is displayed on a screen of the display device.

6. The display system of claim 1, wherein based on the relative speed being greater than or equal to the second set value, the controller is further configured to:
    extract a license plate area of the approaching object and store the extract license plate area as an image; or
    output a warning message regarding the approaching object on a screen of the display device.

7. The display system of claim 1, wherein the controller is further configured to receive an input of the second set value via a user interface.

8. The display system of claim 1, wherein the controller is further configured to receive, via a user interface, an input indicating whether to activate a function of changing the zoom magnification.

9. The display system of claim 8, wherein the controller is further configured to receive an input to allow the function of changing the zoom magnification to be activated based on a preset state of traffic congestion being satisfied.

10. The display system of claim 9, wherein in response to receiving the input to allow the function of changing the zoom magnification to be activated based on the preset state of traffic congestion being satisfied, the controller is further configured to receive navigation information related to the traffic congestion, and activate, based on the navigation information related to the traffic congestion, a function of outputting a front image or surround view monitor (SVM) top view image.

11. The display system of claim 1, further comprising a camera configured to obtain a front image or a surround view monitor (SVM) top view image,
    wherein the controller is further configured to:
    determine whether a speed of the vehicle is lower than or equal to a third set value, and
    based on the speed of the vehicle being lower than or equal to the third set value, output the front image or the SVM top view image on a screen of the display device.

12. The display system of claim 11, wherein the controller is further configured to allow the front image or the SVM top view image to be output separately from the image output with the changed zoom magnification.

13. The display system of claim 11, wherein the controller is further configured to receive, via a user interface, an input indicating whether to activate the third set value or an input indicating whether to activate a function of outputting the front image or the SVM top view image.

14. The display system of claim 13, wherein the controller is further configured to receive an input to allow the function of outputting the front image or the SVM top view image to be activated based on a preset state of traffic congestion being satisfied.

15. The display system of claim 14, wherein in response to receiving the input to allow the function of outputting the front image or the SVM top view image to be activated based on the preset state of the traffic congestion being satisfied, the controller is further configured to receive navigation information related to the traffic congestion, and activate, based on the navigation information related to the traffic congestion, a function of outputting the front image or the SVM top view image.

16. The display system of claim 1, wherein the current zoom magnification is configured to display the image of the approaching object such that a size of the displayed image of the approaching object corresponds to a size of a real-time image of the approaching object, and wherein the changed magnification is configured to display the image of the approaching object such that an enlarged size of the displayed image of the approaching object is greater than a size of a real-time image of the approaching object to provide a warning to a driver of the vehicle.

17. A display system for a vehicle, the display system comprising:

a sensor configured to detect an approaching object at a rear side of the vehicle;

at least one camera configured to obtain an image of the approaching object;

a display device configured to output the image obtained by the camera; and a controller configured to:

receive driving-related information related to the approaching object from the sensor, determine whether the driving-related information satisfies a preset criterion, change, based on the driving-related information satisfying the preset criterion, a zoom magnification of the image, and output the image with the changed zoom magnification on the display device, wherein the controller is further configured to:

determine, based on a turn signal of the vehicle being off, an approaching object directly behind the vehicle as the approaching object, or determine, based on a turn signal of the vehicle being on, an approaching object laterally behind the vehicle as the approaching object.

18. The display system of claim 17, wherein for detection of an approaching object directly behind the vehicle, the controller is configured to limit a detection range of the sensor to a width of a driving lane of the vehicle.

19. The display system of claim 17, wherein for detection of an approaching object laterally behind the vehicle, the controller is configured to limit a detection range of the sensor to a width of a driving lane of the approaching object laterally behind the vehicle.

* * * * *